(12) United States Patent
Suzuki et al.

(10) Patent No.: US 7,876,315 B2
(45) Date of Patent: Jan. 25, 2011

(54) THIN IMAGE DISPLAY APPARATUS

(75) Inventors: Kazuyoshi Suzuki, Tokyo (JP);
Yasuhisa Nakajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 892 days.

(21) Appl. No.: 11/730,951

(22) Filed: Apr. 5, 2007

(65) Prior Publication Data

US 2007/0247452 A1     Oct. 25, 2007

(30) Foreign Application Priority Data

Apr. 6, 2006     (JP)     ............................. 2006-105712

(51) Int. Cl.
G06F 3/038     (2006.01)
G09G 5/00     (2006.01)
H04N 5/655     (2006.01)
H04N 7/173     (2006.01)
G02F 1/1333     (2006.01)
H01Q 1/12     (2006.01)
H05K 5/02     (2006.01)

(52) U.S. Cl. .......................... 345/211; 348/827; 725/93; 349/58; 343/718; 248/343

(58) Field of Classification Search .................. 345/211; 248/343

See application file for complete search history.

(56) References Cited

U.S. PATENT DOCUMENTS

| | | | | |
|---|---|---|---|---|
| 6,104,443 | A * | 8/2000 | Adcock et al. | 348/827 |
| 6,377,223 | B1 * | 4/2002 | Clapp et al. | 343/718 |
| 2001/0043166 | A1 * | 11/2001 | Jacobsen et al. | 345/27 |
| 2004/0237113 | A1 * | 11/2004 | Tseng | 725/93 |
| 2005/0105012 | A1 * | 5/2005 | Kim et al. | 349/58 |

(Continued)

FOREIGN PATENT DOCUMENTS

CN     1 750 634 A     3/2006

(Continued)

OTHER PUBLICATIONS

European Search Report from European Patent Office dated Jan. 21, 2009, for Application No. 07251380.7-1241/1843579, 9 pages.

(Continued)

*Primary Examiner*—Sumati Lefkowitz
*Assistant Examiner*—Charles Hicks
(74) *Attorney, Agent, or Firm*—Finnegan Henderson Farabow Garret & Dunner LLP

(57) ABSTRACT

A thin image display apparatus includes a thin image display apparatus body, a hollow support member having a first end at which the hollow support member supports the thin image display apparatus body through a rocking mechanism section and a second end at which a plug element configured to engage with an illumination apparatus wiring member attached to the ceiling or a wall is provided, and a power line extending through the hollow support member and configured to connect the plug element and the thin image display apparatus body to each other. The thin image display apparatus body receives, when the plug element engages with the illumination apparatus wiring member, power supplied through the power line together with a modulated image signal supplied through the power line such that an image based on the modulated image signal is displayed on the thin image display apparatus body.

11 Claims, 10 Drawing Sheets

U.S. PATENT DOCUMENTS

2005/0108760 A1    5/2005    Iwamura

FOREIGN PATENT DOCUMENTS

| DE | 20 2005 011344 U1 | 1/2005 |
| DE | 20 2004 018366 U1 | 3/2005 |
| DE | 200 23 673 U1 | 8/2005 |
| JP | 10-79902 | 3/1998 |
| JP | 10-293543 | 11/1998 |
| JP | 3115376 | 9/2000 |
| JP | 2002-32033 | 1/2002 |
| JP | 2002-064765 | 2/2002 |
| JP | 2003-18558 | 1/2003 |
| JP | 2004-205859 | 7/2004 |
| JP | 2005-221653 | 8/2005 |
| JP | 2005-295135 | 10/2005 |

OTHER PUBLICATIONS

Peerless Industries, Inc., "Technical Data Sheet—Straight Column Flat Panel Ceiling Mount" [Online] 2005, pp. 1-3, XP002509708, Retrieved from the Internet: URL:http://www.ergodirect.com/images/peerless/plcm/technical-data.pdf, [retrieved on Jan. 9, 2009].

Peerless Industries, Inc., "Technical Data Sheet—LCD Ceiling Mount," [Online] 2005, pp. 1-4, X)002509709, Retrieved from the Internet: URL:http://www.ergodirect.com/images/peerless/1cc-18c/technical-data.pdf, [retrieved on Jan. 9, 2009].

* cited by examiner

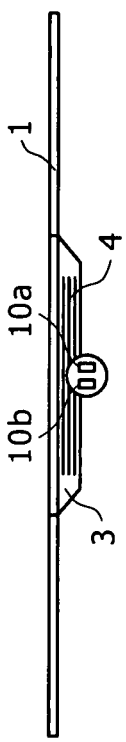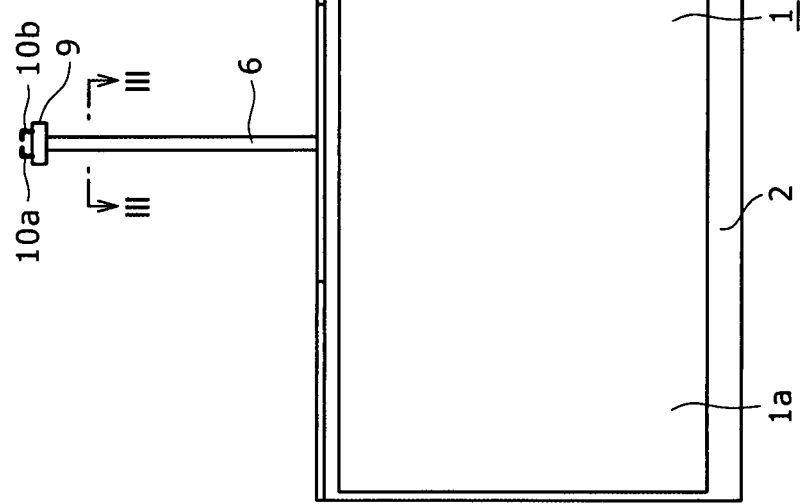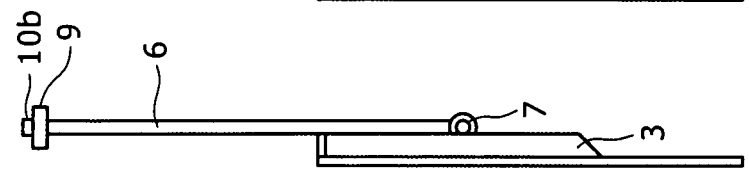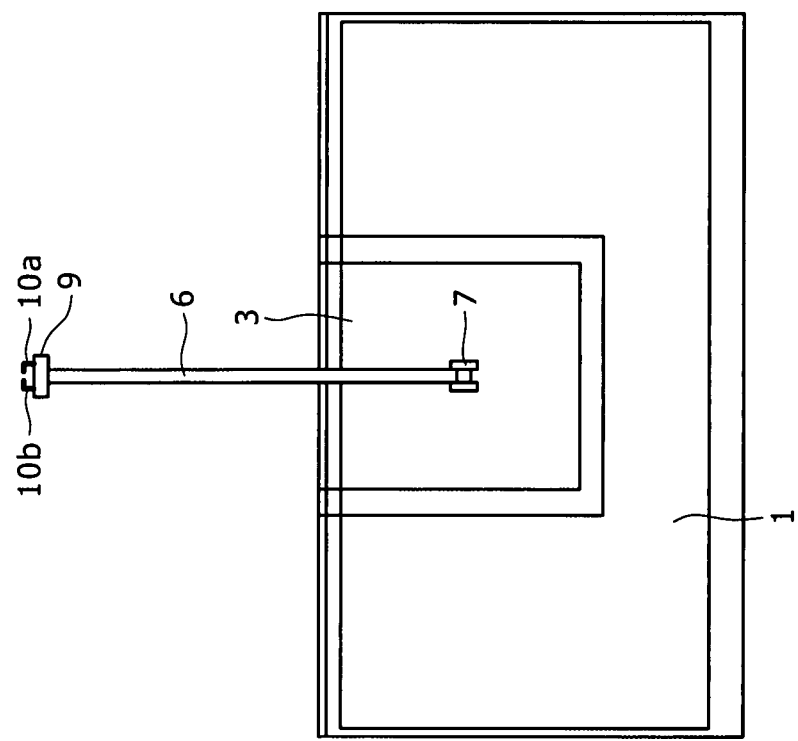

FIG.5A    FIG.5B    FIG.5C
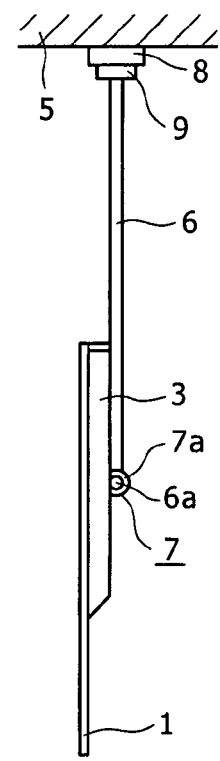
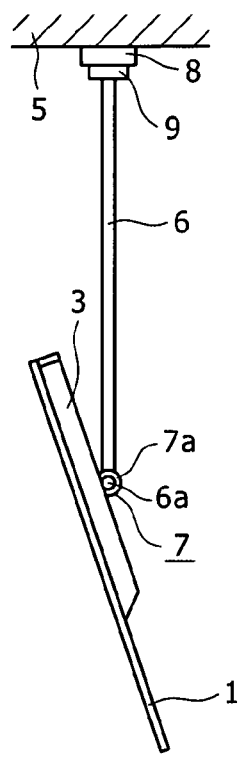
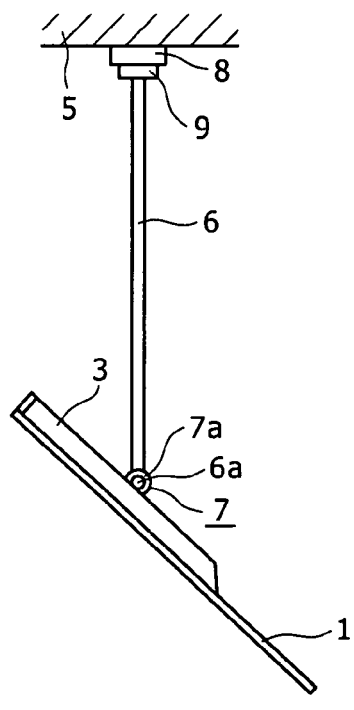
FIG.6
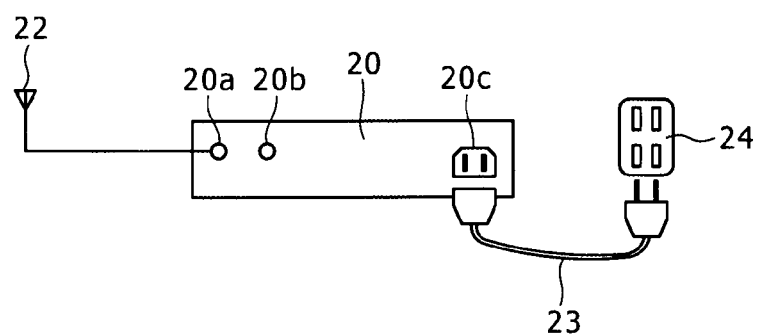

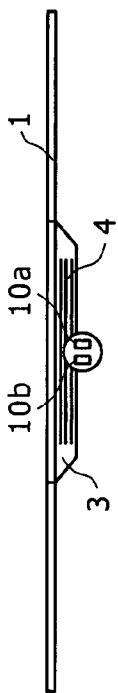
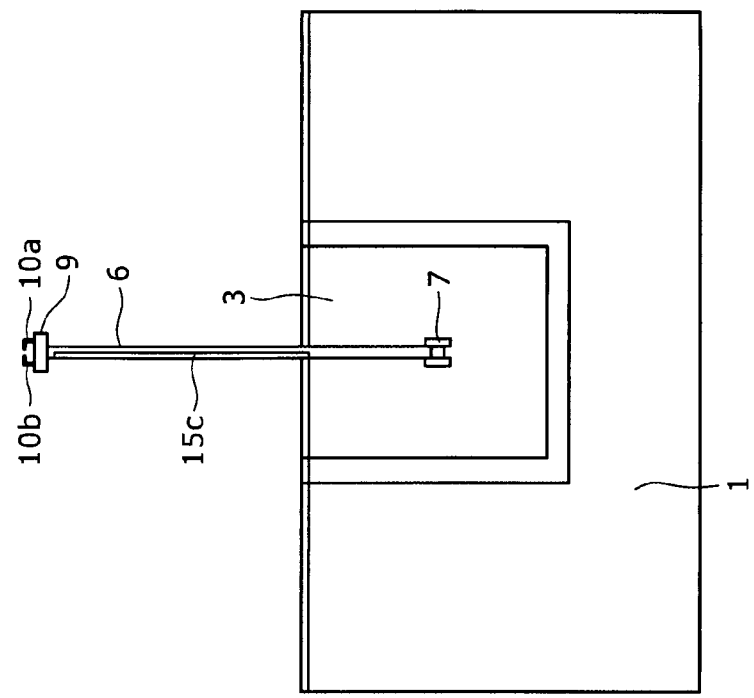
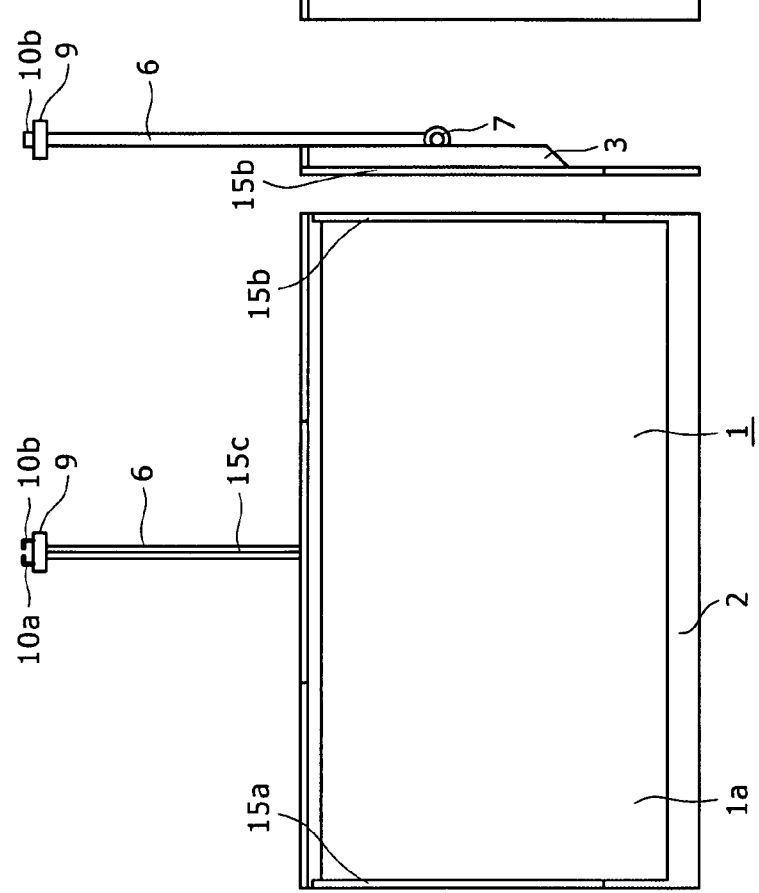

THIN IMAGE DISPLAY APPARATUS

CROSS REFERENCES TO RELATED APPLICATIONS

The present invention contains subject matter related to Japanese Patent Application JP 2006-105712 filed with the Japan Patent Office on Apr. 6, 2006, the entire contents of which being incorporated herein by reference.

BACKGROUND OF THE INVENTION

1. Field of the Invention

This invention relates to a comparatively light-weighted thin image display apparatus which uses a thin display panel such as an organic electroluminescence display panel or a liquid crystal display panel.

2. Description of the Related Art

A planar type display apparatus which is suspended on the ceiling is in the past known and disclosed in Japanese Patent Laid-Open No. 2002-32033.

SUMMARY OF THE INVENTION

Where it is tried to suspend a thin image display apparatus on the ceiling or the like so that a user can enjoy an image on the thin image display apparatus, it is necessary to connect some cable or an antenna line connected to a receiver antenna to the suspended thin image display apparatus in order to transmit an image signal to the thin image display apparatus. Therefore, apparently miscellaneous wiring lines may be required and deteriorate a fine sight. Also the arrangement location of the thin image display apparatus is restricted disadvantageously.

On the other hand, where a receiver antenna is directly built in the suspended thin image display apparatus, due to the property of the thin image display apparatus that it is installed indoors, the thin image display apparatus sometimes fails to receive an image signal because of a variation of the sensitivity which depends upon the position of the receiver antenna. Therefore, the suspended thin image display apparatus is disadvantageous in that the arrangement location thereof is restricted.

Therefore, it is demanded to provide a thin image display apparatus which may not require apparently miscellaneous wiring lines and can be installed while providing a fine sight. Also it is demanded to provide a thin image display apparatus which can receive an image signal even if the sensitivity varies depending upon the position of a receiver antenna and is free from restriction of the installation location.

According to an embodiment of the present invention, there is provided a thin image display apparatus including a thin image display apparatus body, a hollow support member having a first end at which the hollow support member supports the thin image display apparatus body through a rocking mechanism section and a second end at which a plug element configured to engage with an illumination apparatus wiring member attached to the ceiling or a wall is provided, and a power line extending through the hollow support member and configured to connect the plug element and the thin image display apparatus body to each other, the thin image display apparatus body receiving, when the plug element engages with the illumination apparatus wiring member, power supplied through the power line together with a modulated image signal supplied through the power line such that an image based on the modulated image signal is displayed on the thin image display apparatus body.

According to another embodiment of the present invention, there is provided a thin image display apparatus including a thin image display apparatus body configured to receive a modulated image signal transmitted by radio transmission from a receiver apparatus provided separately, a hollow support member having a first end at which the hollow support member supports the thin image display apparatus body through a rocking mechanism section and a second end at which a plug element configured to engage with an illumination apparatus wiring member attached to the ceiling or a wall is provided, and a power line extending through the hollow support member and configured to connect the plug element and the thin image display apparatus body to each other, the thin image display apparatus body receiving, when the plug section engages with the illumination apparatus wiring device, power supplied through the power line, receiving the modulated image signal transmitted by radio such that an image based on the modulated image signal is displayed on the thin image display apparatus body.

With the thin image display apparatus, power is supplied through the power line disposed in the inside of the support member and an image signal is supplied through the power line or by radio communication. Therefore, the thin image display apparatus do not become apparently miscellaneous and can be installed while keeping a fine appearance.

Further, with the thin image display apparatus, an image signal is supplied from the reception apparatus, which is provided separately from the thin image display apparatus body, through the power line or by radio communication. Therefore, there is no restriction to wiring, and a receiver antenna can be placed at a position at which it exhibits a high sensitivity. Consequently, there is no disadvantage by failure of reception of an image signal, and there is no restriction to the arrangement location of the thin image display apparatus body.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 1A, 1B, 1C and 1D are a front elevational view, a rear elevational view, a right side elevational view and a top plan view, respectively, of a thin image display apparatus to which the present invention is applied;

FIGS. 5A, 5B and 5C are side elevational views of the thin image display apparatus which is suspended in different manners on the ceiling;

FIG. 6 is a schematic view showing an example of a receiver apparatus;

FIGS. 8A, 8B, 8C and 8D are a front elevational view, a rear elevational view, a right side elevational view and a top plan view, respectively, of another thin image display apparatus to which the present invention is applied;

DETAILED DESCRIPTION OF THE PREFERRED EMBODIMENTS

Referring to FIGS. 1A to 7, there is shown a thin image display apparatus to which the present invention is applied.

The thin image display apparatus is generally configured such that a thin image display apparatus body is suspended on the ceiling using a support member and power is supplied to the thin image display apparatus body through a power line disposed in the inside of the support member and also an image signal is supplied through the power line.

Referring first to FIGS. 1A to 1D, the thin image display apparatus shown includes a thin image display apparatus body 1 of a comparatively small thickness which uses a comparatively light-weighted thin display panel such as an organic electroluminescence display panel or a liquid crystal display panel. The front face of the thin image display apparatus body 1 includes an image display section 1a and a framework 2 surrounding the image display section 1a as seen in FIG. 1A.

Figure 7:
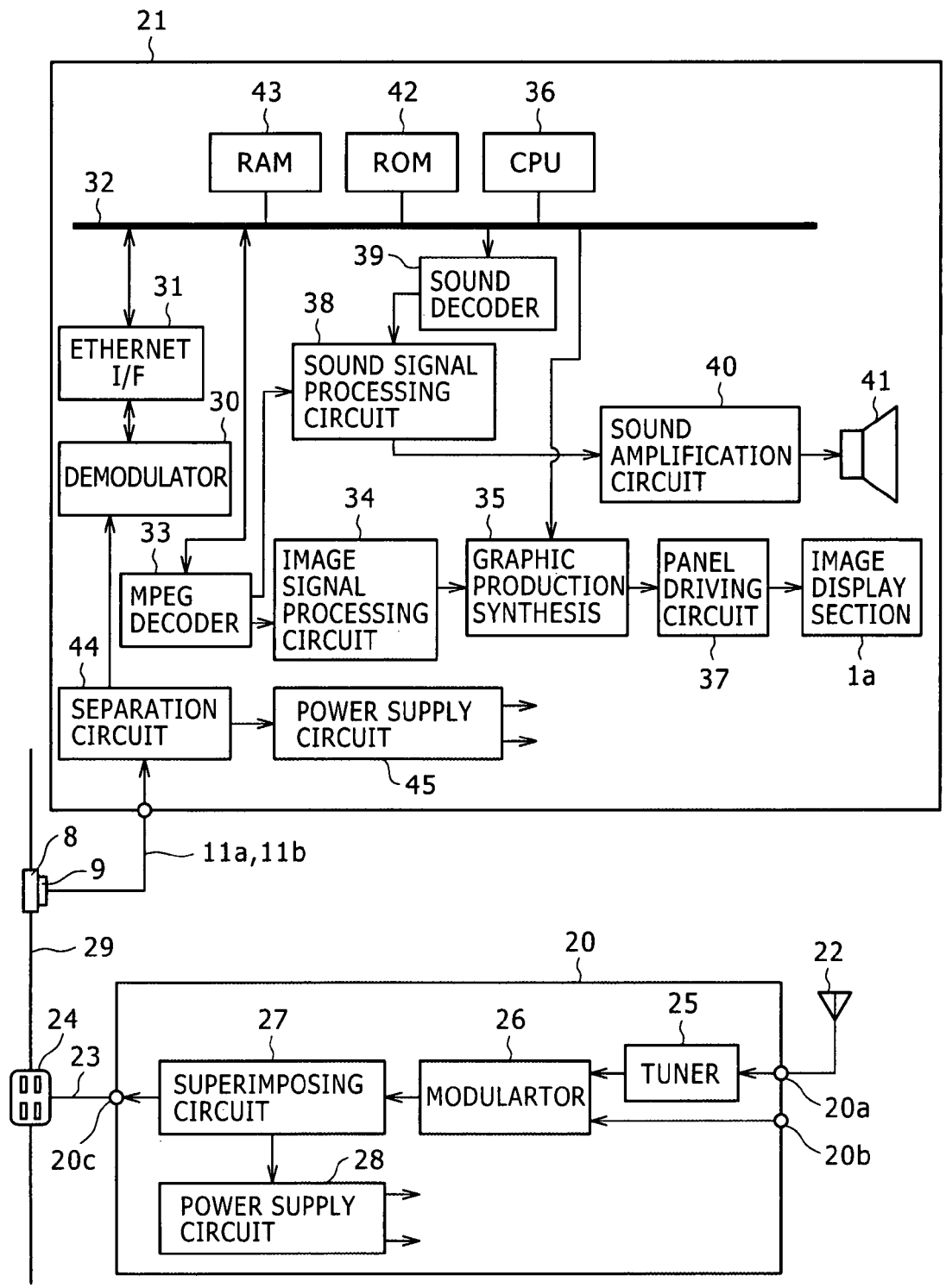
FIG. 7 is a block diagram showing an electric configuration of the thin image display apparatus.

The rear face of the thin image display apparatus body 1 is shown in FIG. 1B. Referring to FIG. 1B, the rear face of the thin image display apparatus body 1 has a driving display circuit accommodation section 3 provided at an upper portion of a central portion of the rear face thereof and covering such a driving display circuit as shown in FIG. 7 hereinafter described for displaying an image on the image display section 1a. A heat radiating opening 4 in the form of a slit for radiating heat generated from the driving display circuit therethrough is provided at an upper portion of the driving display circuit accommodation section 3 as seen in FIG. 1D.

In the present thin image display apparatus, a hollow support member 6 for suspending the thin image display apparatus body 1 on a ceiling 5 or a wall is attached at a lower or second end thereof to the driving display circuit accommodation section 3 of the rear face of the thin image display apparatus body 1 through a rocking mechanism 7.

The hollow support member 6 is formed as a rigid member so that it receives tensile stress arising from the weight of the thin image display apparatus body 1 to hold the thin image display apparatus body 1 in a predetermined posture.

Figure 4:
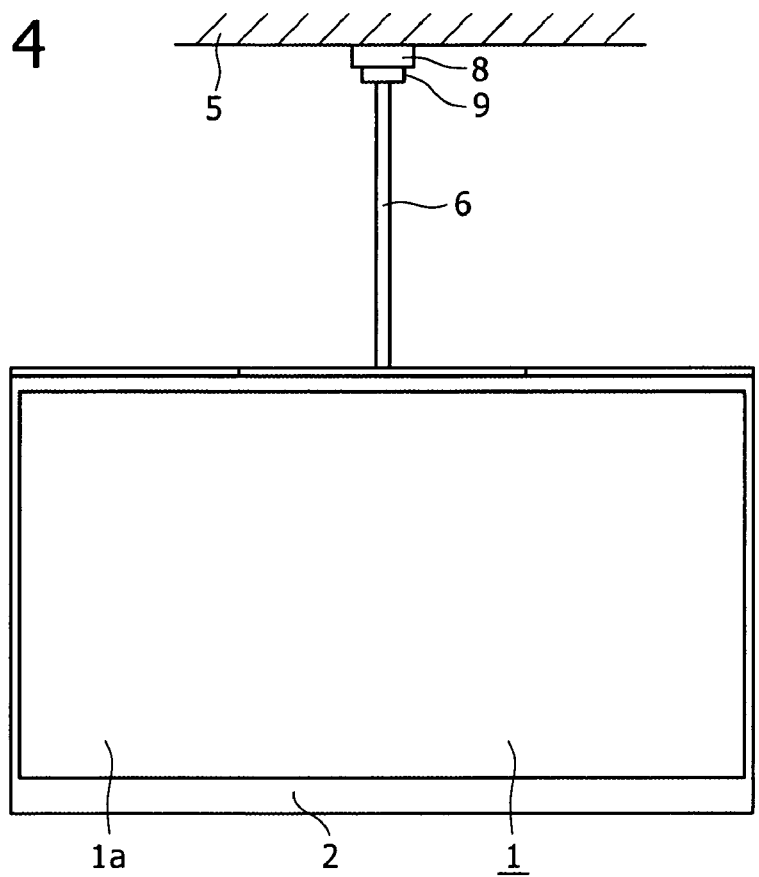
FIG. 4 is a front elevational view of the thin image display apparatus suspended on the ceiling.

Further, referring to FIG. 4, in the present thin image display apparatus, a plug 9 for being mechanically secured to a ceiling rosette 8 to establish electric connection is provided at an upper or first end of the support member 6. The ceiling rosette 8 is a ceiling wiring device for an illumination apparatus which is secured to the ceiling 5 or the like of a house and suspends an illumination apparatus thereon for establishing electric connection.

Figure 2:
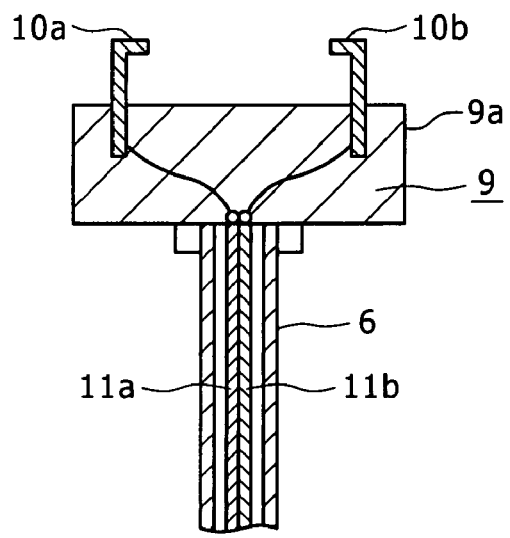
FIG. 2 is an enlarged sectional view showing part of the thin image display apparatus.

Referring to FIG. 2, the plug 9 is formed by integral molding of a synthetic resin material at the first end of the support member 6 and including a pair of electrodes 10a and 10b each formed from an L-shaped metal member and disposed in a spaced relationship by a predetermined distance from each other. The electrodes 10a and 10b are connected to power lines 11a and 11b disposed in the inside of the hollow support member 6.

The plug 9 includes a plug body 9a configured so as to hold the electrodes 10a and 10b and the support member 6 so that the total load of the thin image display apparatus body 1, support member 6 and power lines 11a and 11b can be supported by the electrodes 10a and 10b when the electrodes 10a and 10b are mechanically secured to the ceiling rosette 8.

Figure 3:
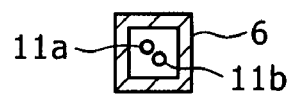
FIG. 3 is an enlarged sectional view taken along line III-III of FIG. 1A.

As seen in FIG. 3 which shows a sectional view of the support member 6 taken along line III-III of FIG. 1A, the two power lines 11a and 11b are disposed in the hollow of the hollow support member 6. The power lines 11a and 11b are led to the driving display circuit accommodation section 3 of the thin image display apparatus body 1 and supply power to a driving display circuit and so forth hereinafter described therethrough.

In this instance, the plug 9 is mechanically secured to the ceiling rosette 8 by means of the electrodes 10a and 10b each in the form of an L-shaped metal member and is electrically connected to power supply terminals of the ceiling rosette 8.

Referring to FIGS. 5A to 5C, the rocking mechanism 7 includes a support shaft 6a provided at the second end of the support member 6 and extending leftwardly and rightwardly, and a bearing 7a provided integrally with the driving display circuit accommodation section 3 on the rear face of the thin image display apparatus body 1 so as to support the support shaft 6a.

The rocking mechanism 7 can fix the thin image display apparatus body 1 at an arbitrary angular position. Consequently, the thin image display apparatus body 1 can change its angle or posture within a range from a vertical angular position at which the thin image display apparatus body 1 lies in parallel to the support member 6 to a horizontal angular position at which the thin image display apparatus body 1 lies in a horizontal direction as seen in FIGS. 5A, 5B and 5C. In short, the thin image display apparatus body 1 can be held in a posture of a predetermined angle in accordance with a viewing condition.

In this instance, if the length of the support member 6 is set greater than the length from the rocking mechanism 7 to the upper end of the thin image display apparatus body 1, then the degree of freedom in installation of the ceiling rosette 8 to which the plug 9 is to be attached can be increased.

Further, if the rocking mechanism 7 is provided at a position between the vertical center and the upper end of the rear face of the driving display circuit accommodation section 3 of the thin image display apparatus body 1 and substantially at the center in the leftward and rightward direction, then the fulcrum is positioned closely to the center of gravity of the thin image display apparatus body 1. Therefore, even if the angle of the thin image display apparatus body 1 is set as seen in FIG. 5A, 5B or 5C, no bending stress is applied to the support member 6 but tensile stress is applied. Therefore, no deforming force is applied to any of the plug 9 and the ceiling rosette 8 to which the plug 9 is attached, and consequently, the strength of them can be maintained.

Further, in the present thin image display apparatus, an image signal is transmitted to the thin image display apparatus body 1 by power line communication (PLC) using a power line 29 as seen in FIGS. 6 and 7.

Referring to FIGS. 6 and 7, a receiver apparatus 20 is provided separately from the thin image display apparatus body 1. Further, a driving display circuit 21 is provided in the thin image display apparatus body 1 as seen in FIG. 7.

Referring to FIG. 6, the receiver apparatus 20 includes a reception signal input terminal 20a to which a reception signal is supplied from a receiver antenna 22, an external signal input terminal 20b to which an image signal is supplied from the outside, and a power supply input terminal 20c for being connected to a home plug socket 24 through a power supply cable 23.

Referring now to FIG. 7, the receiver apparatus 20 includes a tuner 25 which demodulates a reception signal received by the receiver antenna 22 and supplies the demodulated image signal to a predetermined modulator 26. Meanwhile, the image signal from the external signal input terminal 20b is supplied to the modulator 26.

The image signal modulated by the modulator 26 is supplied to a superimposing circuit 27. The superimposing circuit 27 superimposes the image signal on the power line 29 through the power supply input terminal 20c using a technique which utilizes a power line as a communication line, that is, the technique of power line communication. In the thin image display apparatus, the image signal modulated by the modulator 26 successively passes the superimposing circuit 27, power supply input terminal 20c and power supply cable 23 and is superimposed on a power line 29 in a home from the home plug socket 24. The image signal further passes the ceiling rosette 8 for an illumination apparatus, the plug 9, the electrodes 10a and 10b and the power lines 11a and 11b and is transmitted to a demodulator 30 through the driving display circuit 21 of the thin image display apparatus body 1. In this instance, commercial power supply from the power supply input terminal 20c is supplied through the superimposing circuit 27 to a power supply circuit 28 of the receiver apparatus 20. Meanwhile, commercial power obtained by a separation circuit 44 is supplied to a power supply circuit 45 of the thin image display apparatus body 1.

For the protocol to be used in this instance, for example, the TCP/IP which is used in the Internet is used where digital transmission is applied.

The driving display circuit 21 in the thin image display apparatus is shown in FIG. 7. Referring to FIG. 7, a modulated image signal supplied to the driving display circuit 21 is demodulated by the demodulator 30 and is then introduced to an internal bus 32 through an Ethernet (registered trademark) I/F (interface) 31.

The image signal from the internal bus 32 is supplied to an image signal processing circuit 34 through an MPEG decoder 33. The image signal is subject to various signal processes by the image signal processing circuit 34 and is then supplied to a graphic production synthesis circuit 35.

The graphic production synthesis circuit 35 produces a necessary graphic screen by operation of the thin image display apparatus in accordance with a command of a CPU 36. The graphic production synthesis circuit 35 superposes the graphic screen on the image signal and supplies a resulting signal or supplies the graphic screen in place of the image signal to a panel driving circuit 37. The panel driving circuit 37 converts the image signal into a signal necessary for the image display section 1a of the thin image display apparatus body 1 and supplies the signal to the image display section 1a so that an image is displayed on the image display section 1a.

Meanwhile, a sound signal from the MPEG decoder 33 is supplied to a sound signal processing circuit 38 while a sound signal from the internal bus 32 is supplied to the sound signal processing circuit 38 through a sound decoder 39. The sound signal is subject to various signal processes by the sound signal processing circuit 38 and is then supplied to a speaker 41 through a sound amplification circuit 40 so that sound is generated from the speaker 41.

The CPU 36 takes charge of control of the thin image display apparatus. Software necessary for the control by the CPU 36 is stored in advance in a ROM 42, and a RAM 43 is provided for allowing the CPU 36 to execute the software. The CPU 36, ROM 42 and RAM 43 are connected to each other by the internal bus 32.

As described above, power is supplied through the power lines 11a and 11b disposed in the inside of the support member 6 to the thin image display apparatus body 1 while an image signal is supplied to the thin image display apparatus body 1 by power line communication through the power line 29. Consequently, the wiring lines do not become apparently miscellaneous, and the thin image display apparatus can be installed while keeping a fine appearance.

Further, in the present thin image display apparatus, an image signal is supplied from the receiver apparatus 20 provided separately from the thin image display apparatus body 1 to the thin image display apparatus body 1 through the power lines 11a, 11b and 29. Therefore, there is no restriction to wiring, and the receiver antenna 22 can be placed at a position at which it exhibits a high sensitivity. Consequently, there is no disadvantage of failure of reception of an image signal, and there is no restriction to the arrangement location of the thin image display apparatus body 1.

FIGS. 8A to 10 show another thin image display apparatus to which the present invention is applied.

The thin image display apparatus shown in FIGS. 8A to 10 are generally configured such that a thin image display apparatus body is suspended on the ceiling by means of a support member and power is supplied to the thin image display apparatus body through power lines disposed in the inside of the support member while an image signal is provided by radio communication by a receiver apparatus provided separately from the thin image display apparatus body.

Referring to FIGS. 8A to 10, the thin image display apparatus body 1 is suspended on the ceiling 5 by the mechanism similar to that described hereinabove with reference to FIGS. 1A to 5C. However, in the thin image display apparatus of FIGS. 8A to 10, radio antennas 15a and 15b for receiving an image signal by radio communication from a receiver apparatus 50 hereinafter described are provided perpendicularly on the opposite left and right sides of the framework 2 of the thin image display apparatus body 1. Or, a radio antenna 15c is provided along the support member 6.

In this instance, attention is paid to the outer profile such that the radio antennas 15a, 15b and 15c are provided integrally on the thin image display apparatus body 1 and the support member 6 so as not to project from the thin image display apparatus body 1 and the support member 6, respectively, so that the thin image display apparatus may not become miscellaneous in design but is installed while keeping an apparently fine appearance.

For the radio communication, for example, 802.11n or the like which belongs to the IEEE 802.11 system and allows high speed communication is used, and an antenna compatible with the MIMO (Multiple-Input Multiple-Output) is used for the radio antennas 15a, 15b and 15c.

In the present thin image display apparatus, the radio antennas 15a and 15b are provided on the framework 2 of an outer peripheral portion of the thin image display apparatus body 1. Consequently, a good reception state can be achieved. Further, since MIMO reception is used, the radio antennas 15a and 15b can be installed in a spaced relationship from each other, and consequently, a good reception state can be achieved.

Further, where the radio antenna 15c is provided along the support member 6, since it is installed in a spaced relationship from the thin image display apparatus body 1, a good reception state can be achieved.

Figure 9:
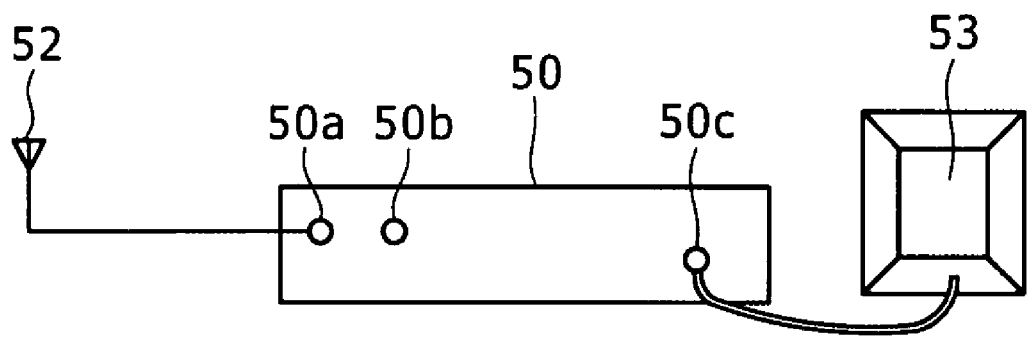
FIG. 9 is a schematic view showing another example of a receiver apparatus.
Figure 10:
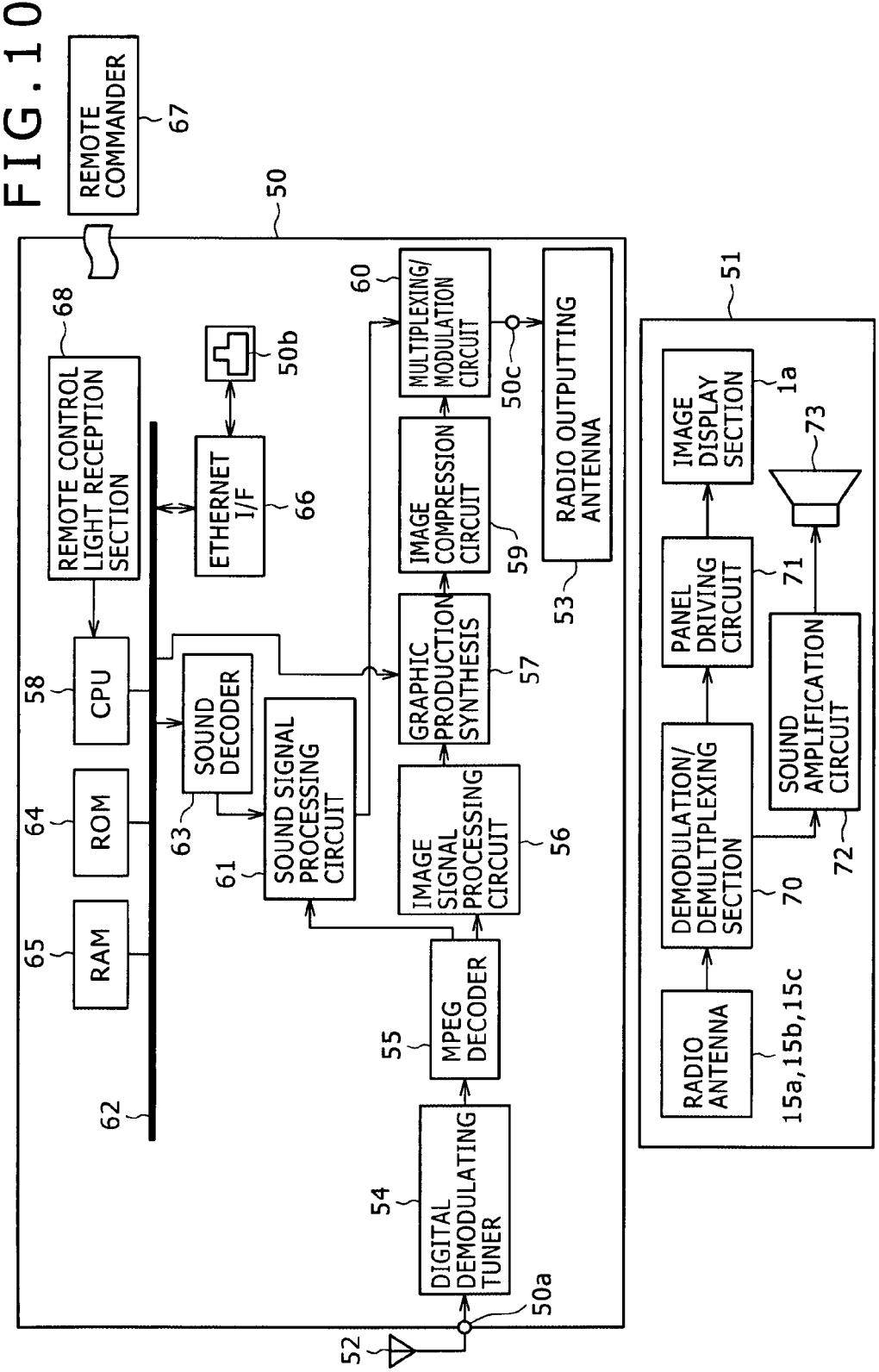
FIG. 10 is a block diagram showing an electric configuration of the thin image display apparatus shown in FIGS. 8A to 8D.

Further, in the thin image display apparatus of FIGS. 8A to 10, an image signal is transmitted by radio communication from the receiver apparatus 50 provided separately from the thin image display apparatus body 1 as seen in FIGS. 9 and 10 to the thin image display apparatus body 1.

Referring to FIGS. 9 and 10, the receiver apparatus 50 is provided separately from the thin image display apparatus body 1 while a driving display circuit 51 is provided in the thin image display apparatus body 1.

The receiver apparatus 50 includes a reception signal input terminal 50a to which a reception signal, for example, from a digital broadcast receiving antenna 52 is supplied, a network terminal 50b to which an image signal is supplied from the outside, and an antenna terminal 50c to which a radio outputting antenna 53 is connected.

In the receiver apparatus 50, a reception signal received by the digital broadcast receiving antenna 52 is supplied to a digital demodulating tuner 54, by which the reception signal is converted into an MPEG-TS stream. The MPEG-TS stream is supplied to an MPEG decoder 55, and an image signal obtained by the MPEG decoder 55 is supplied to an image signal processing circuit 56.

The image signal is subject to various signal processes by the image signal processing circuit 56 and is then supplied to a graphic production synthesis circuit 57. The graphic production synthesis circuit 57 produces a graphic screen in response to an operation of the thin image display apparatus in accordance with a command from a CPU 58. The graphic production synthesis circuit 57 superposes or replaces the graphic screen on or with the image signal and supplies a resulting signal to an image compression circuit 59.

The image compression circuit 59 compresses the image signal received from the graphic production synthesis circuit 57 with a codec suitable for a frequency band for transmission and supplies the compressed image signal to a multiplexing/modulation circuit 60.

Meanwhile, a sound signal is supplied from the MPEG decoder 55 to a sound signal processing circuit 61 while a sound signal from an internal bus 62 is supplied to the sound signal processing circuit 61 through a sound decoder 63. The sound signal is subject to various signal processes by the sound signal processing circuit 61 and is then supplied to the multiplexing/modulation circuit 60.

The compressed image signal and the sound signal are synthesized and modulated by the multiplexing/modulation circuit 60 and then supplied to the radio outputting antenna 53 so that they are transmitted by radio transmission.

The CPU 58 takes charge of control of the thin image display apparatus, and software necessary for the control by the CPU 58 is stored in a ROM 64. Further, a RAM 65 for allowing the CPU 58 to execute the software is provided. The CPU 58, ROM 64 and. RAM 65 are connected to each other by the internal bus 62.

An external signal from the network terminal 50b is supplied to the internal bus 62 through an Ethernet I/F 66. Further, a remote control signal from a remote commander 67 is supplied to a remote control light reception section 68 and then supplied from the remote control light reception section 68 to the CPU 58 so that the receiver apparatus 50 is remotely controlled by the remote commander 67.

The driving display circuit 51 provided in the thin image display apparatus body 1 of the present thin image display apparatus receives, at any of the radio antennas 15a, 15b and 15c thereof, a transmission signal transmitted from the radio outputting antenna 53. The reception signal received by the radio antenna 15a, 15b or 15c is supplied to a demodulation/demultiplexing section 70.

The demodulation/demultiplexing section 70 demodulates the reception signal and demultiplexes it into an image signal and a sound signal. The image signal obtained by the demodulation/demultiplexing section 70 is supplied to a panel driving circuit 71. The panel driving circuit 71 converts the image signal into a signal necessary for the image display section 1a of the thin image display apparatus body 1 and supplies the signal to the image display section 1a so that an image is displayed by the image display section 1a.

Meanwhile, the sound signal obtained by the demodulation/demultiplexing section 70 is supplied to a speaker 73 through a sound amplification circuit 72 so that sound is outputted from the speaker 73.

According to an embodiment of the thin image display apparatus, power is supplied to the thin image display apparatus body 1 through the power lines 11a and 11b disposed in the inside of the support member 6 while an image signal is supplied by radio communication to the thin image display apparatus body 1. Consequently, the wiring lines do not become apparently miscellaneous, and the thin image display apparatus can be installed while keeping a fine appearance.

Further, according to an embodiment of the present thin image display apparatus, an image signal is supplied by radio communication to the thin image display apparatus body 1 from the receiver apparatus 50 provided separately from the thin image display apparatus body 1. Therefore, there is no restriction to the wiring. Further, the digital broadcast receiving antenna 52, radio outputting antenna 53 and radio antennas 15a, 15b and 15c can be placed at positions at which they exhibit a high sensitivity. Consequently, there is no disadvantage of failure of reception of an image signal, and there is no restriction to the arrangement location of the thin image display apparatus body 1.

It is to be noted that, while, in the thin image display apparatus described hereinabove, the plug 9 provided at one end of the support member 6 is mechanically secured to the ceiling rosette 8 provided on the ceiling 5, the plug 9 may otherwise be attached directly to a wiring duct rail 12 for illumination or through an adapter 13 combined therewith.

Figure 11A:
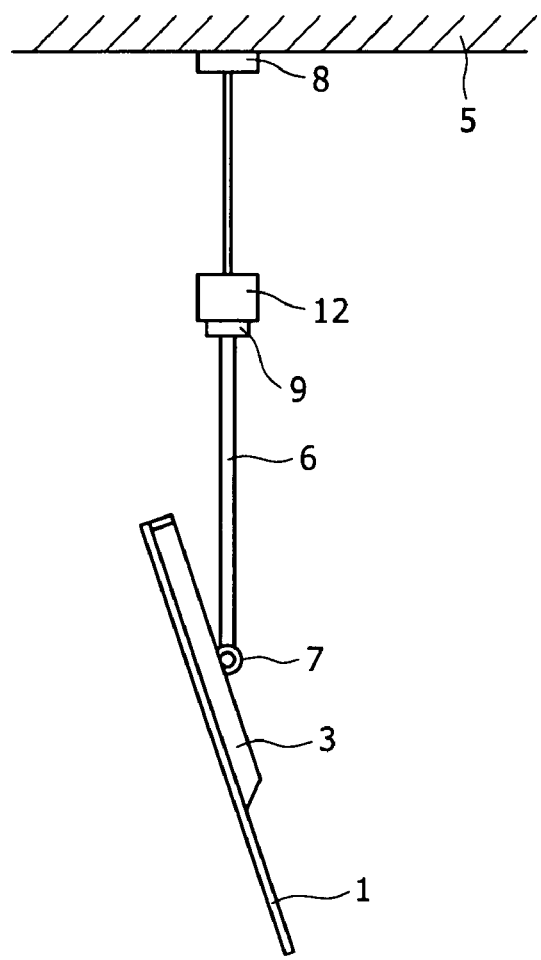
FIGS. 11A and 11B are a side elevational view and a perspective view of a further thin image display apparatus to which the present invention is applied.
Figure 11B:
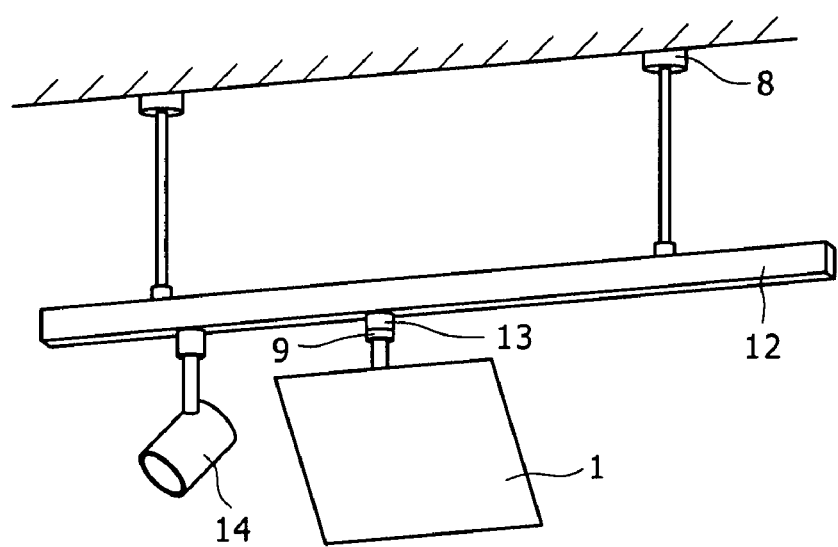

For example, as seen in FIG. 11A, the plug 9 provided at one end of the support member 6 is mechanically secured directly and electrically connected to a wiring duct rail 12 for illumination suspended from the ceiling rosette 8 of the ceiling 5. In this instance, the plug 9 may be mechanically secured and electrically connected to the wiring duct rail 12 for illumination through the adapter 13 combined with the plug 9 as seen in FIG. 11B. In FIG. 11B, an illumination apparatus 14 is mechanically secured and electrically connected to the wiring duct rail 12 for illumination.

Figure 12:
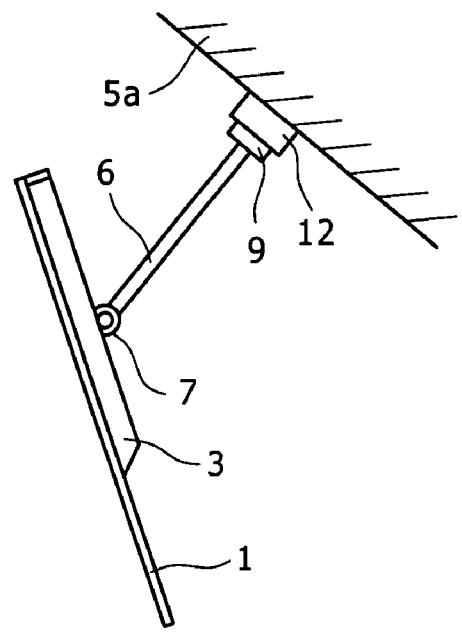
FIGS. 12, 13 and 14 are perspective views of different thin image display apparatus to which the present invention is applied.

Meanwhile, as seen in FIG. 12, the wiring duct rail 12 for illumination may be secured to a ceiling portion inclined face 5a while the plug 9 provided at one end of the support member 6 is mechanically secured and electrically connected to the wiring duct rail 12.

Figure 13:
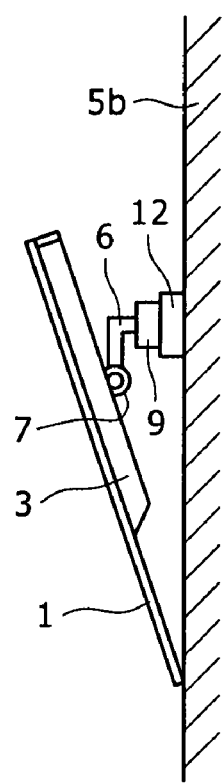

Further, as seen in FIG. 13, the wiring duct rail 12 for illumination may be secured to a vertical wall face 5b while the plug 9 provided at one end of the support member 6 is mechanically secured and electrically connected to the wiring duct rail 12.

Further, the support member 6 does not necessarily have to be disposed vertically although it depends upon the length and the strength of the support member 6, the weight of the thin image display apparatus body 1 and the wiring duct rail 12 (refer to the arrangements of FIGS. 12 and 13).

Further, where the thin image display apparatus body 1 is attached to the wiring duct rail 12 for illumination of the wall face 5b as seen in FIG. 13, the rocking mechanism 7 may be adjusted to an angle at which the lower end of the thin image display apparatus body 1 is held by the wall face 5b so that the force to be applied to be wiring duct rail 12 may be reduced.

Further, while, in the thin image display apparatus described hereinabove, the rocking mechanism 7 is rocked around the support shaft 6a, the rocking mechanism 7 may otherwise be mounted for movement also in a vertical direction on the support member 6 or may be formed from a universal joint.

Figure 14:
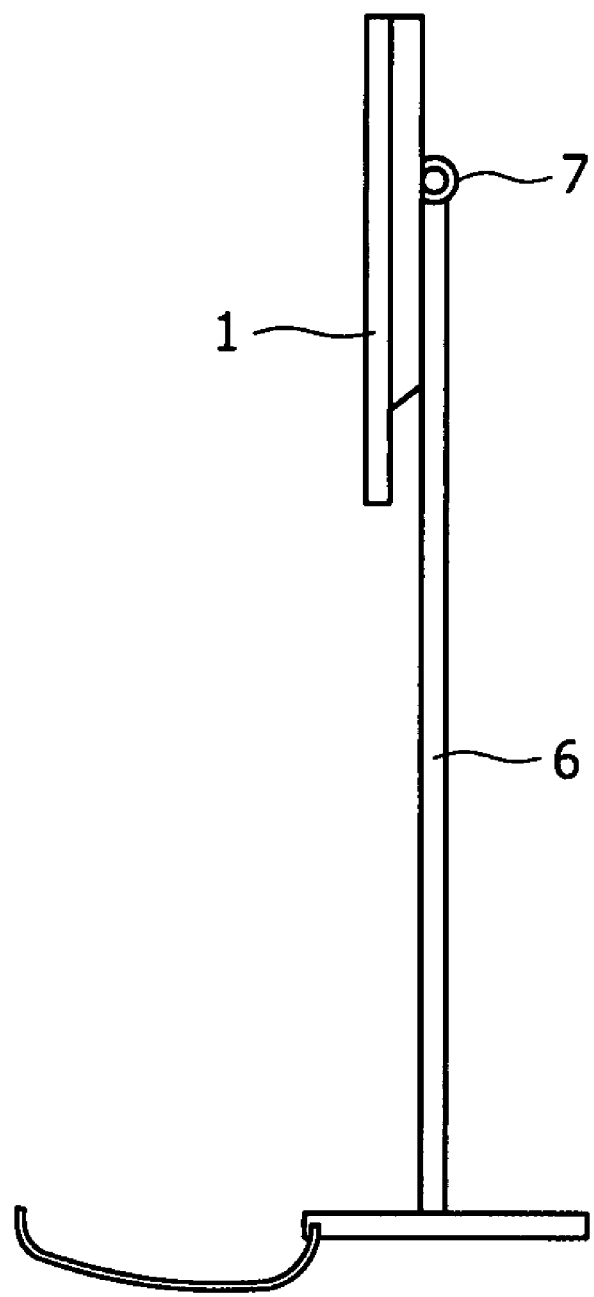

Further, while, in the thin image display apparatus described hereinabove, the thin image display apparatus body 1 is suspended on the ceiling 5 or the wall face 5b by means of the support member 6, the thin image display apparatus body 1 may otherwise be supported in a stand-like fashion by means of the support member 6 as seen in FIG. 14. Except this, the thin image display apparatus of the arrangement of FIG. 14 is configured similarly to the thin image display apparatus described hereinabove with reference to FIGS. 1A to 7 or FIGS. 8A to 10. Also with the thin image display apparatus of FIG. 14, similar advantages to those of the thin image display apparatus of FIGS. 1A to 7 or FIGS. 8A to 10 can be achieved.

While preferred embodiments of the present invention have been described using specific terms, such description is for illustrative purposes only, and it is to be understood that changes and variations may be made without departing from the spirit or scope of the following claims.

What is claimed is:

1. A thin image display apparatus, comprising:
   a thin image display apparatus body;
   a hollow support member having a first end at which said hollow support member supports said thin image display apparatus body through a rocking mechanism section and a second end directly connected to a plug element having a plug body holding a first metal member and a second metal member configured to directly mechanically and electrically engage with an illumination apparatus wiring member attached to a ceiling or a wall is provided; and
   a power line extending through said hollow support member and configured to connect said plug element and said thin image display apparatus body to each other;
   said thin image display apparatus body receiving, when said plug element directly mechanically and electrically engages with said illumination apparatus wiring member though the first metal member and the second metal member, power supplied through said power line together with a modulated image signal supplied through said power line such that an image based on the modulated image signal is displayed on said thin image display apparatus body,
   wherein, said first metal member and said second metal member are configured to support said thin image display apparatus.

2. The thin image display apparatus according to claim 1, wherein said support member holds a position of the rear face side of said thin image display apparatus body substantially at the center of gravity through said rocking mechanism section.

3. The thin image display apparatus according to claim 2, wherein said support member has a length greater than the length from an upper end of said thin image display apparatus to the position of the center of gravity, and said rocking mechanism section allows said thin image display apparatus body to have an angular position within a range from a vertical position to a horizontal position.

4. The thin image display apparatus according to claim 1, wherein said thin image display apparatus body includes an image display section configured to display the image thereon, a framework section configured to surround said image display section, a driving display circuit section configured to process the power and the modulated image signal and cause said image display section to display the image, and a driving display circuit section accommodation section configured to cover said driving display circuit section from the rear face side of said thin image display apparatus body, and
   said driving display circuit section accommodation section is disposed at an upper portion of a central portion in the leftward and rightward direction of the rear face of said thin image display apparatus body and has a slit for heat radiation formed on an upper end face thereof.

5. The thin image display apparatus according to claim 1, wherein said thin image display apparatus body includes a driving display circuit section configured to process the power and the image signal to display the image, and said driving display circuit section includes
   a demultiplexing circuit section connected to said power line and configured to demultiplex the power and the modulated image signal from each other,
   a power supply circuit section configured to produce power to be supplied to a predetermined circuit of said driving display circuit section from the power demultiplexed by said demultiplexing circuit section, and
   an image processing block configured to perform a process for the demodulated image signal demultiplexed by said demultiplexing circuit section to display the image on said thin image display apparatus body.

6. A thin image display apparatus, comprising:
   a thin image display apparatus body configured to receive a modulated image signal transmitted by radio transmission from a receiver apparatus provided separately;
   a hollow support member having a first end at which said hollow support member supports said thin image display apparatus body through a rocking mechanism section and a second end directly connected to a plug element having a plug body holding a first metal member and a second metal member configured to directly mechanically and electrically engage with an illumination apparatus wiring member attached to a ceiling or a wall; and
   a power line extending through said hollow support member and configured to connect said plug element and said thin image display apparatus body to each other;
   said thin image display apparatus body receives, when said plug section directly mechanically and electrically engages with said illumination apparatus wiring device through the first metal member and the second metal member, power supplied through said power line, and receives the modulated image signal transmitted by radio such that an image based on the modulated image signal is displayed on said thin image display apparatus body,
   wherein, said first metal member and said second metal member are configured to support said thin image display apparatus.

7. The thin image display apparatus according to claim 6, wherein said support member holds a position of the rear face side of said thin image display apparatus body substantially at the center of gravity through said rocking mechanism section.

8. The thin image display apparatus according to claim 7, wherein said support member has a length greater than the length from an upper end of said thin image display apparatus to the position of the center of gravity, and said rocking mechanism section allows said thin image display apparatus body to have an angular position within a range from a vertical position to a horizontal position.

9. The thin image display apparatus according to claim 6, wherein said thin image display apparatus body includes an image display section configured to display the image, a framework section configured to surround said image display section, a driving display circuit section configured to process the power and the modulated image signal and cause said image display section to display the image, and a driving display circuit section accommodation section configured to cover said driving display circuit section from the rear face side of said thin image display apparatus body, and said driving display circuit section accommodation section is disposed at an upper portion of a central portion in the leftward and rightward direction of the rear face of said thin image display apparatus body and has a slit for heat radiation formed on an upper end face.

10. The thin image display apparatus according to claim 6, further comprising a radio antenna for receiving the modulated image signal transmitted by radio provided on a framework outside an image display section of said thin image display apparatus integrally with said thin image display apparatus body.

11. The thin image display apparatus according to claim 6, further comprising a radio antenna for receiving the modulated image signal transmitted by radio provided integrally with said support member.

\* \* \* \* \*